(12) United States Patent
Scharp et al.

(10) Patent No.: US 7,946,216 B2
(45) Date of Patent: May 24, 2011

(54) TWO-PART PISTON FOR AN INTERNAL COMBUSTION ENGINE

(75) Inventors: Rainer Scharp, Vaihingen (DE); Bernd Mahr, Plochingen (DE)

(73) Assignee: Mahle International GmbH, Stuttgart (DE)

( * ) Notice: Subject to any disclaimer, the term of this patent is extended or adjusted under 35 U.S.C. 154(b) by 320 days.

(21) Appl. No.: 11/792,659

(22) PCT Filed: Nov. 28, 2005

(86) PCT No.: PCT/DE2005/002137
§ 371 (c)(1),
(2), (4) Date: Aug. 3, 2007

(87) PCT Pub. No.: WO2006/060987
PCT Pub. Date: Jun. 15, 2006

(65) Prior Publication Data
US 2007/0289568 A1    Dec. 20, 2007

(30) Foreign Application Priority Data
Dec. 8, 2004 (DE) .......................... 10 2004 058 968

(51) Int. Cl.
*F16J 1/00* (2006.01)
(52) U.S. Cl. .......................................... 92/218; 92/186
(58) Field of Classification Search ............ 92/217–219, 92/186
See application file for complete search history.

(56) References Cited

U.S. PATENT DOCUMENTS

| | | | | |
|---|---|---|---|---|
| 1,789,570 A * | 1/1931 | Teetor | ............................. | 92/218 |
| 2,051,547 A | 8/1936 | Crist | | |
| 2,409,852 A | 10/1946 | Harrah | | |
| 2,638,080 A * | 5/1953 | Pielstick | ......................... | 92/186 |
| 4,343,229 A | 8/1982 | Tsuzuki et al. | | |

FOREIGN PATENT DOCUMENTS

| | | |
|---|---|---|
| DE | 29 23 934 C2 | 12/1979 |
| DE | 42 03 384 A1 | 8/1993 |
| DE | 43 08 751 A1 | 9/1994 |
| DE | 198 15 989 A1 | 10/1999 |
| DE | 100 42 422 C1 | 4/2002 |
| DE | 101 16 084 A1 | 10/2002 |
| DE | 202 20 644 U1 | 1/2004 |

* cited by examiner

*Primary Examiner* — F. Daniel Lopez
(74) *Attorney, Agent, or Firm* — Collard & Roe, P.C.

(57) ABSTRACT

The invention relates to a two-piece piston (1) for an internal combustion engine, comprising a piston upper piece (2) and a piston lower piece (2). A cylindrical molding (24) is arranged on the underside of the piston upper piece (2), facing away from the piston crown, lying coaxial to the piston axis (15), with two radial outward-facing hooked projections (27) on the end thereof facing away from the piston crown. The piston lower piece (6) has an opening (16) on the piston crown side, in which the cylindrical molding (24) with the projections (27) is introduced and rotated on assembly of the piston upper piece (2) on the piston lower piece (6), such that the projections (27) engage behind the edge of the opening (16).

2 Claims, 3 Drawing Sheets

TWO-PART PISTON FOR AN INTERNAL COMBUSTION ENGINE

CROSS REFERENCE TO RELATED APPLICATIONS

Applicants claim priority under 35 U.S.C. §119 of German Application No. 10 2004 058 968.2 filed Dec. 8, 2004. Applicants also claim priority under 35 U.S.C. §365 of PCT/DE2005/002137 filed Nov. 28, 2005. The international application under PCT article 21(2) was not published in English.

The invention relates to a two-part piston for an internal combustion engine.

A two-part piston consisting of a piston crown and a piston shirt is known from the patent DE 42 03 384 C2; in it, the two parts of the piston are connected with one another by means of a bayonet closure. In this connection, a neck that engages into the piston shirt is formed onto the piston crown, with four locking noses that project radially outward projecting at its end, which noses engage under locking projections of the piston shirt that point radially inward, in the connected position. In order to lock the rotation position of the bayonet closure in place, a catch projection is formed on the underside surfaces of each locking projection, which engages into a catch recess of the related locking nose, in each instance. In this connection, the complexity of the bayonet closure is a disadvantage, which leads to making the two-part piston known from the state of the art significantly more expensive.

It is the task of the present invention to avoid this disadvantage of the state of the art. This task is accomplished with the characteristics standing in the characterizing part of the main claim. Practical embodiments of the invention are the object of the dependent claims.

In this connection, all that is required to connect the upper piston part with the lower piston part is a coaxially disposed, cylindrical formed-on part, at the end of which there are two projections that lie opposite one another, directed radially outward so as to form a T-shape with the cylindrical formed-on part, which projections engage behind the edge of an opening worked into the lower piston part during assembly of the two piston parts.

Because of the fact that the opening is disposed in an elastically resilient region of the lower piston part and catch noses are situated at the edge of the opening facing away from the piston crown, a permanent, firm catch connection between upper piston part and lower piston part is obtained.

Figure 1:
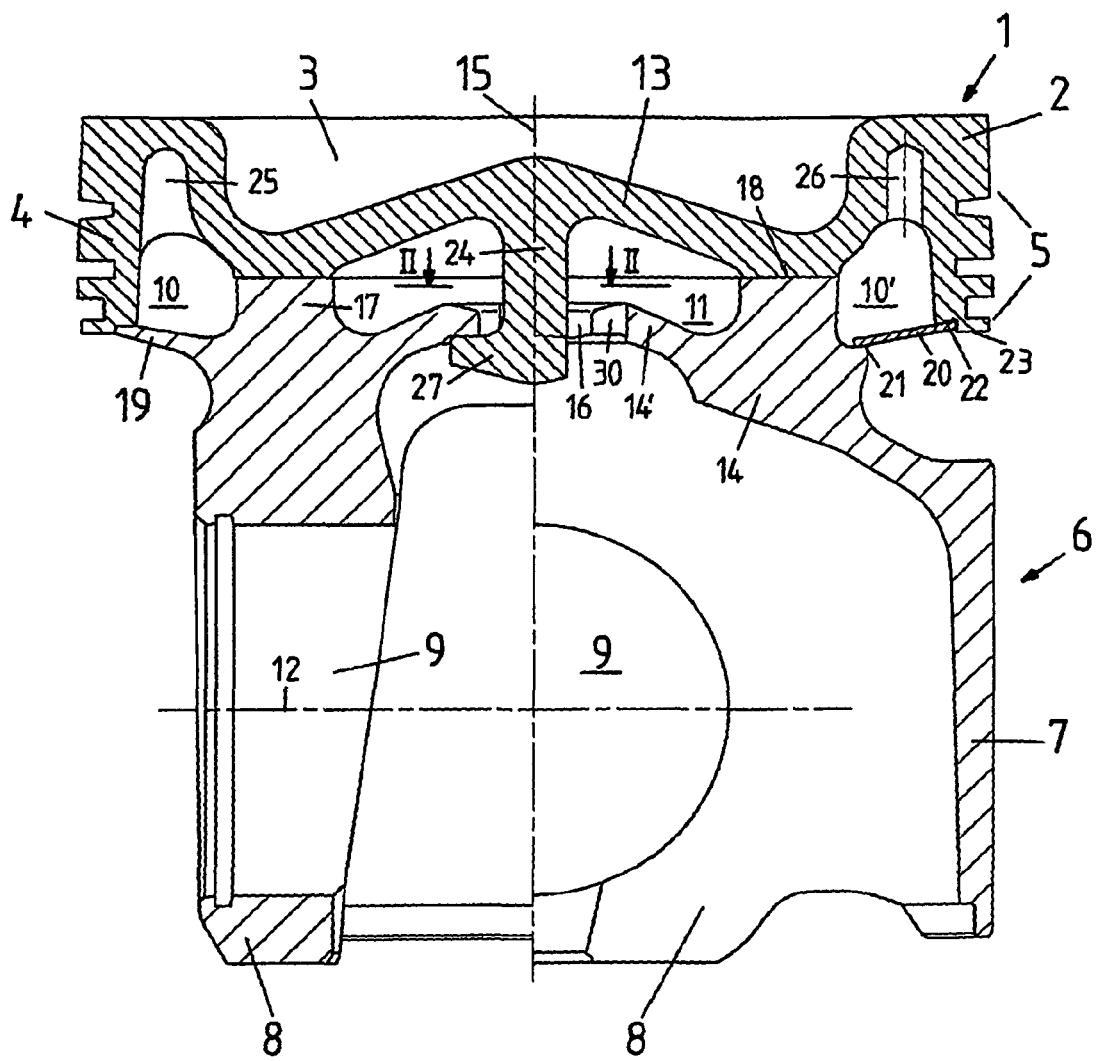
Figure 4:
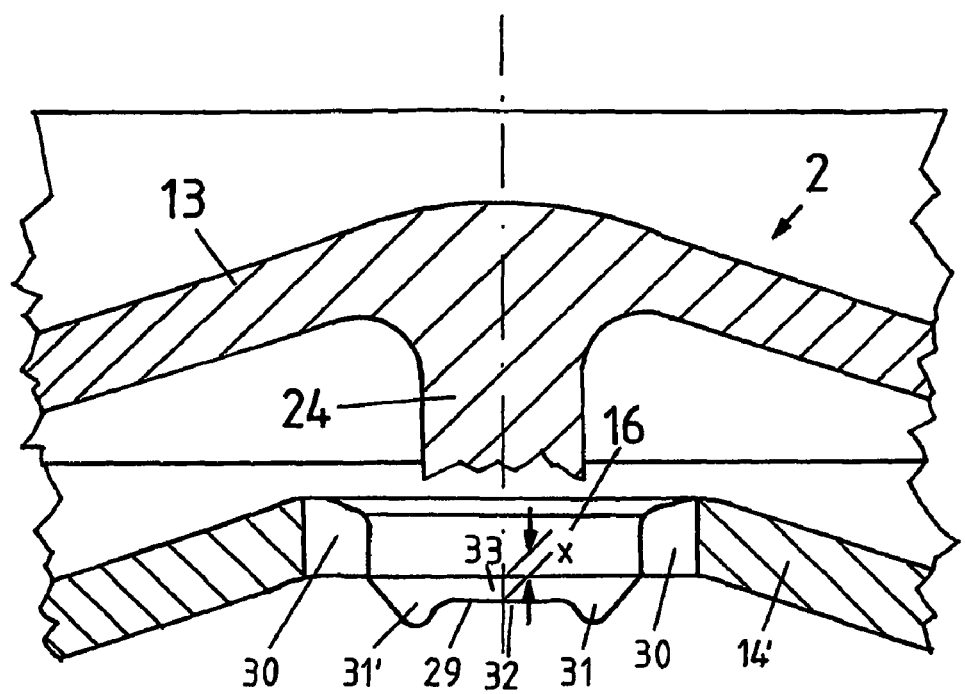
Figure 2:
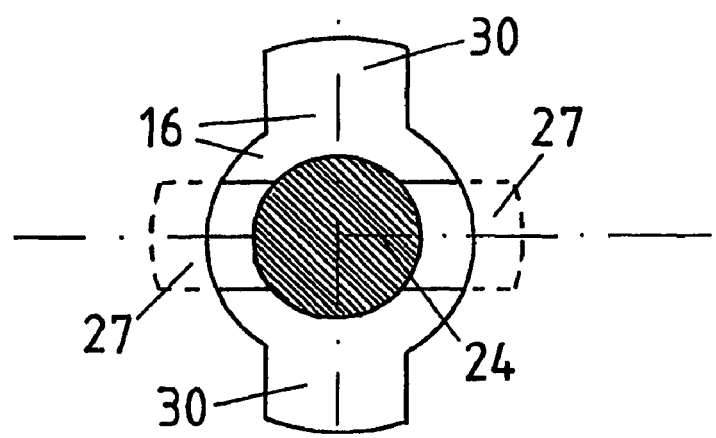
Figure 3:
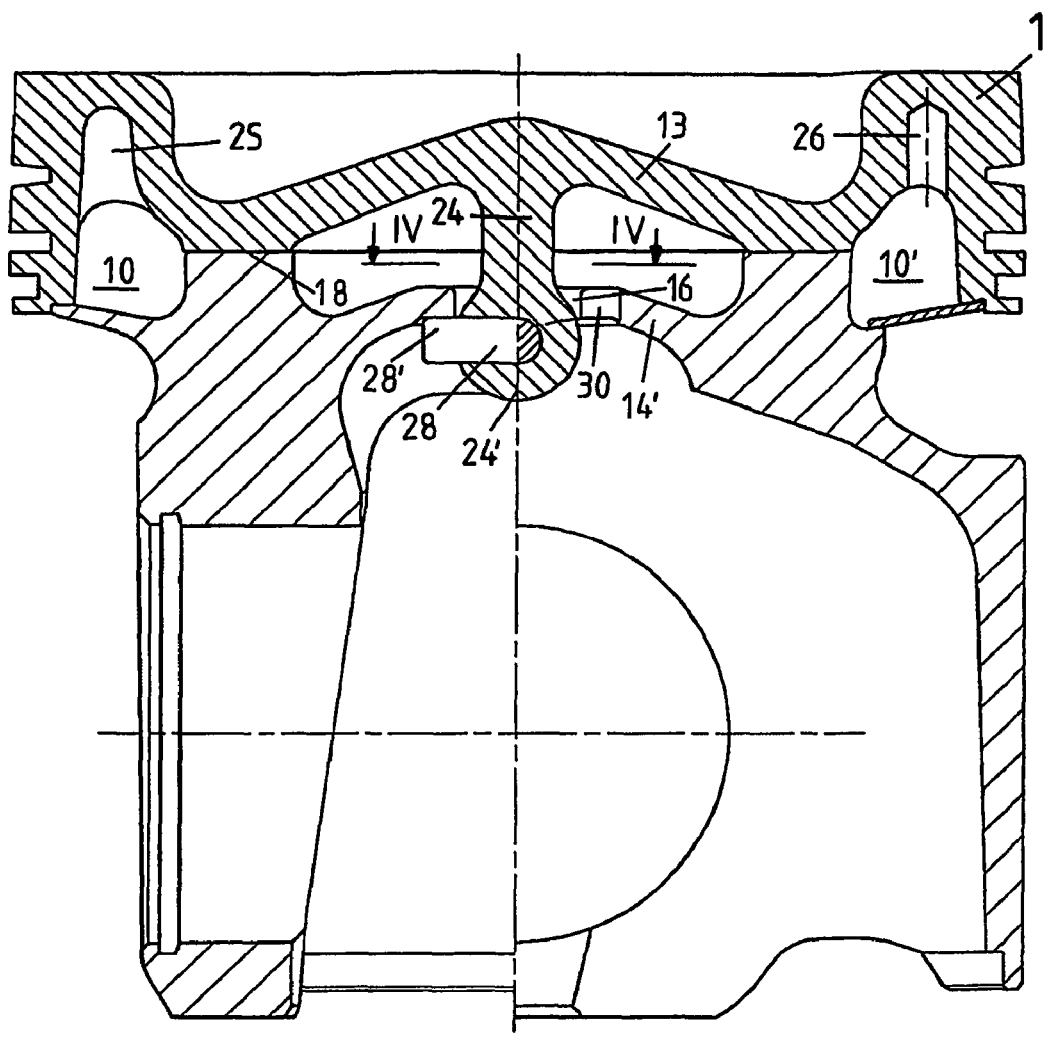

Several exemplary embodiments of the invention will be described below, using the drawings. These show:

FIG. 1 a two-part piston having an upper part, in section, which is connected with a lower part of the piston by way of a first embodiment of the rotary closure according to the invention, FIG. 2 a section along the line II-II in FIG. 1, which shows a top view of an opening that is part of the rotary closure, FIG. 3 the two-part piston in section, in which the upper part and the lower part are connected with one another by way of another embodiment of the rotary closure, and FIG. 4 a partial section through the upper part and the lower part of the piston, which shows the opening in the lower piston part that is part of the rotary closure.

FIG. 1 shows a two-part, cooled piston 1, which consists of an upper piston part 2 having a piston crown 13 and of a lower piston part 6, in a sectional diagram consisting of two halves, the left half of which lies in the direction of the piston pin axis 12 and the right half of which lies perpendicular to that. The upper piston part 2 has a combustion bowl 3 formed into the piston crown 13 and a ring wall 4 having a ring belt 5 on its radial outside.

The lower piston part 6 comprises a box-shaped piston skirt 7 and two pin bosses 8 connected with it, each having a pin bore 9 for accommodating a piston pin, not shown in the figures. On the piston crown side, the lower piston part 6 is delimited by a partition 14 that has a thin-walled and elastically resilient partition region 14' close to the piston axis 15, in which region an opening 16 disposed in the center is made, which is an element of a rotary closure that connects the upper piston part 2 with the lower piston part 6.

On the underside facing away from the piston crown 13, an outer cooling channel 10, 10' is formed into the upper piston part 2 radially on the outside, which channel is delimited radially on the outside by the ring wall 4 and radially on the inside partly by the piston crown 13 and partly by a ring-shaped support rib 17 affixed to the partition 14 on the piston crown side, which forms a ring-shaped contact area 18 for the upper piston part 2.

The underside of the outside cooling channel 10 that faces away from the piston crown can be closed off by a circumferential, disk-shaped cover 19, formed onto the support rib 17, as shown in the left half of the sectional diagram according to FIG. 1. As another possibility for closing off the underside of the cooling channel 10', a ring-shaped disk spring 20 can be used in accordance with the right half of the sectional diagram shown in FIG. 1, which spring rests on a circumferential contact area 21 affixed to the radial outside of the support rib 17 with its radial inside, with bias, and in a recess 22 with its radial outside, which recess is formed into the face 23 of the ring wall 4 that faces away from the piston crown 13. Both the cover 19 and the disk spring 20 have oil inflow and outflow openings not shown in the figures, by way of which cooling oil is passed into the cooling channel 10, 10' and out of it again.

In order to improve the cooling effect of the oil that flows through the cooling channel 10, the top of the cooling channel 10 can have cooling ribs 25, as shown in the left half of the sectional diagram. Furthermore, it is possible to improve the cooling effect of the cooling oil that flows through the cooling channel 10' in that bores 26 are made in the top of the cooling channel 10', as the right half of the sectional diagram according to FIG. 1 shows.

Radially towards the inside, an inner cooling channel 11 follows the support rib 17, the top of which channel is formed by the piston crown 13 and the bottom of which is formed by the partition region 14'. Radially on the outside, the inner cooling channel 11 is delimited by the support rib 17, and radially on the inside, it is delimited by a cylindrical formed-on part 24 that lies coaxial to the piston axis 15, which is formed onto the underside of the piston crown 13. Overflow channels, not shown in the figures, are disposed between the outer cooling channel 10, 10' and the inner cooling channel 11, by way of which the cooling oil is guided from the outer into the inner cooling channel. The cooling oil situated in the inner cooling channel 11 is passed out into the piston interior by way of the opening 16.

Two projections that lie opposite one another, directed radially outward, are affixed to the end of the cylindrical formed-on part 24 that faces away from the piston crown 13, so as to form a T-shape with formed-on part 24. The projections are formed by formed-on parts 27 on the cylindrical formed-on part 24, and engage behind the edge of the opening 16 in the manner of a rotary closure, in order to attach the upper piston part 2 to the lower piston part 6. In FIG. 1, only the left one of the two formed-on parts 27 is visible, since the right half of FIG. 1 shows a section that lies perpendicular to the sectional plane of the left half of FIG. 1, so that here, the projection 27 is disposed behind the cylindrical formed-on part 24, in the viewing direction, and is covered by it. As will be explained in greater detail below, the elasticity of the inner partition region 14' makes a contribution to the strength of this rotary closure in this connection.

The section shown in FIG. 2, along with the line II-II in FIG. 1, shows a top view of the opening 16 formed into the partition region 14', which, as is also indicated in FIG. 1, has two recesses 30 that lie opposite one another. Also, the cylindrical formed-on part 24 is shown in section, and the formed-on parts 27 disposed on the end of the formed-on part 24 facing away from the piston crown side are shown partly in a top view and partly with broken lines. In FIG. 2, they are drawn in a position in which they engage behind the edge of the opening 16. In the assembly of the upper piston part 2 onto the lower piston part 6, both parts 2, 6 must assume a position relative to one another in which the formed-on parts 27 are rotated by 90° relative to the position shown in FIG. 2, so that they can be guided through the recesses 30. Once the upper piston part 2 has come into contact with the contact area 18 of the lower piston part 6 as a result, and once the formed-on parts 27 have been introduced far enough into the opening 16, the upper piston part 2 is rotated by 90°, and the formed-on parts 27 assume the position shown in FIG. 2, in which they engage behind the edge of the opening 16 and thereby connect the upper piston part 2 with the lower piston part 6.

FIG. 3 shows another embodiment of the rotary closure, whereby two projections 28' that lie opposite one another are affixed to the end of the cylindrical formed-on part 24 that faces away from the piston crown 13, which projections are formed by a fitted stud 28 that is disposed in a through bore in the spherical end 24' of the cylindrical formed-on part 24 and projects beyond the bore on both sides, forming the projections 28'. In this connection, the projections 28' engage behind the edge of the opening 16 when the piston 1 has been completely assembled. Because of the form of representation that has been selected, in which the right half of FIG. 3 shows a section that lies perpendicular to the half-section of the left half of FIG. 3, the fitted stud 28 is shown in a side view in the left half of FIG. 3 and in cross-section in the right half of FIG. 3.

FIG. 4 shows the opening 16, in an enlarged partial section, the lower edge of which is configured as a guide 29 for the projections 27, 28', not shown in FIG. 4. The recesses 30 are disposed on both sides of the opening 16; they have radial dimensions that are greater than the radial dimensions of the projections 27, 28', so that in that position of the upper piston part 2 relative to the lower piston part 6 in which the projections 27, 28' point in the direction of the recesses 30, the cylindrical formed-on part 24 can easily be introduced into the opening 16 with the projections 27, 28'. Subsequent to this, the upper piston part 2 is rotated, so that the projections 27, 28' are forced to overcome two catch noses 31, 31' that lie radially opposite one another, of the catch noses 31, 31' that are disposed on both sides of the recesses 30, whereby the inner partition region 14' is briefly deflected out in the direction of the piston crown 13. In this connection, the catch noses 31, 31' serve as a lock to prevent the rotary closure from coming loose.

In the case of a further rotation of the upper piston part 2, the projections 27, 28' come into contact with the region 32 of the guide 29 that lies between the catch noses 31, 31', which region has a contact area 33 having the thickness "x," which is less than the maximal axial dimension of the catch noses 31, 31'. In this connection, the result is achieved, by means of the contact area 33, that the partition region 14' is permanently deflected out in the direction of the piston crown 13 by the amount "x," and this exerts a permanent bias on the cylindrical formed-on part 24 and thereby on the upper piston part 2, which bias brings about a very good strength of the rotary closure according to the invention.

REFERENCE SYMBOL LIST x thickness of the contact area 33
1 piston
2 upper piston part
3 combustion bowl
4 ring wall
5 ring belt
6 lower piston part
7 piston skirt
8 pin boss
9 pin bore
10, 10' outer cooling channel
11 inner cooling channel
12 piston pin axis
13 piston crown
14 partition
14' partition region
15 piston axis
16 opening
17 support rib
18 contact area
19 cover
20 disk spring
21 contact area
22 recess
23 face of the ring wall 4
24 cylindrical formed-on part
24' spherically shaped end of the formed-on part 24
25 cooling rib
26 bore
27 projection, hook-shaped formed-on part
28 fitted stud
28' projection of the fitted stud 28
29 guide
30 recess
31, 31' catch nose
32 region of the guide 29
33 contact area

The invention claimed is:

1. A two-part piston for an internal combustion engine comprising:
   (a) an upper piston part forming a piston crown;
   (b) a lower piston part connected with the upper piston part;
   (c) a piston skirt disposed on a side of the lower piston part facing away from the piston crown;
   (d) two pin bosses lying opposite one another disposed on a side of the lower piston part facing away from the piston crown, each pin boss having a pin bore;
   (e) a solid cylindrical formed-on part lying coaxial to a piston axis disposed on a side of the upper piston part facing away from the piston crown, said solid cylindrical formed-on part having two projections lying opposite one another and directed radially outward, said projections being disposed at an end of the solid cylindrical formed-on part so as to form a T-shape with the solid cylindrical formed-on part;
   wherein the lower piston part is delimited on a side of the piston crown by a partition connected with the piston skirt and with the pin bosses, the partition having an opening coaxial to a piston axis, a radial diameter of the opening being less than a radial length of the projections, wherein the partition has two recesses that lie radially opposite one another, and have radial dimensions that are greater than radial dimensions of the projections;

wherein the solid cylindrical formed-on part is dimensioned such that during assembly of the upper piston part onto the lower piston part and rotation of the upper piston part, the projections enter the recesses and engage behind edges of the opening;

wherein the partition has an elastically resilient region lying coaxial to the piston axis on a radially inner side of the partition, said opening being disposed in said region, said region delimiting an inner cooling channel formed by the upper piston part and a side of the lower piston part;

wherein respective edges of the opening facing away from the piston crown has have surfaces with catch noses on both sides of the recesses, and contact areas on sides of the catch noses facing away from the recesses, such that a thickness of each contact area is less than a maximal axial dimension of the catch noses; and wherein the projections are formed by a fitted stud disposed on an end of the cylindrical formed-on part facing away from the piston crown, the stud projecting radially beyond an end of the formed-on part on both sides.

2. A two-part piston for an internal combustion engine comprising:

(a) an upper piston part forming a piston crown;
(b) a lower piston part connected with the upper piston part;
(c) a piston skirt disposed on a side of the lower piston part facing away from the piston crown;
(d) two pin bosses lying opposite one another disposed on a side of the lower piston part facing away from the piston crown, each pin boss having a pin bore;
(e) a cylindrical formed-on part lying coaxial to a piston axis disposed on a side of the upper piston part facing away from the piston crown, said cylindrical formed-on part having two projections lying opposite one another and directed radially outward, said projections being disposed at an end of the cylindrical formed-on part so as to form a T-shape with the cylindrical formed-on part;

wherein the lower piston part is delimited on a side of the piston crown by a partition connected with the piston skirt and with the pin bosses, the partition having an opening coaxial to a piston axis, a radial diameter of the opening being less than a radial length of the projections, wherein the partition has two recesses that lie radially opposite one another, and have radial dimensions that are greater than radial dimensions of the projections;

wherein the cylindrical formed-on part is dimensioned such that during assembly of the upper piston part onto the lower piston part and rotation of the upper piston part, the projections enter the recesses and engage behind respective edges of the opening;

wherein the projections are formed by a fitted stud disposed on an end of the cylindrical formed-on part facing away from the piston crown, the stud projecting radially beyond an end of the formed-on part on both sides.

* * * * *